Oct. 18, 1949.  V. STRECKER  2,484,915
SHUTTER-OPERATED FLASH SYNCHRONIZING SWITCH
HAVING ADJUSTABLE MOUNTING MEANS
Filed Nov. 5, 1946  2 Sheets-Sheet 1
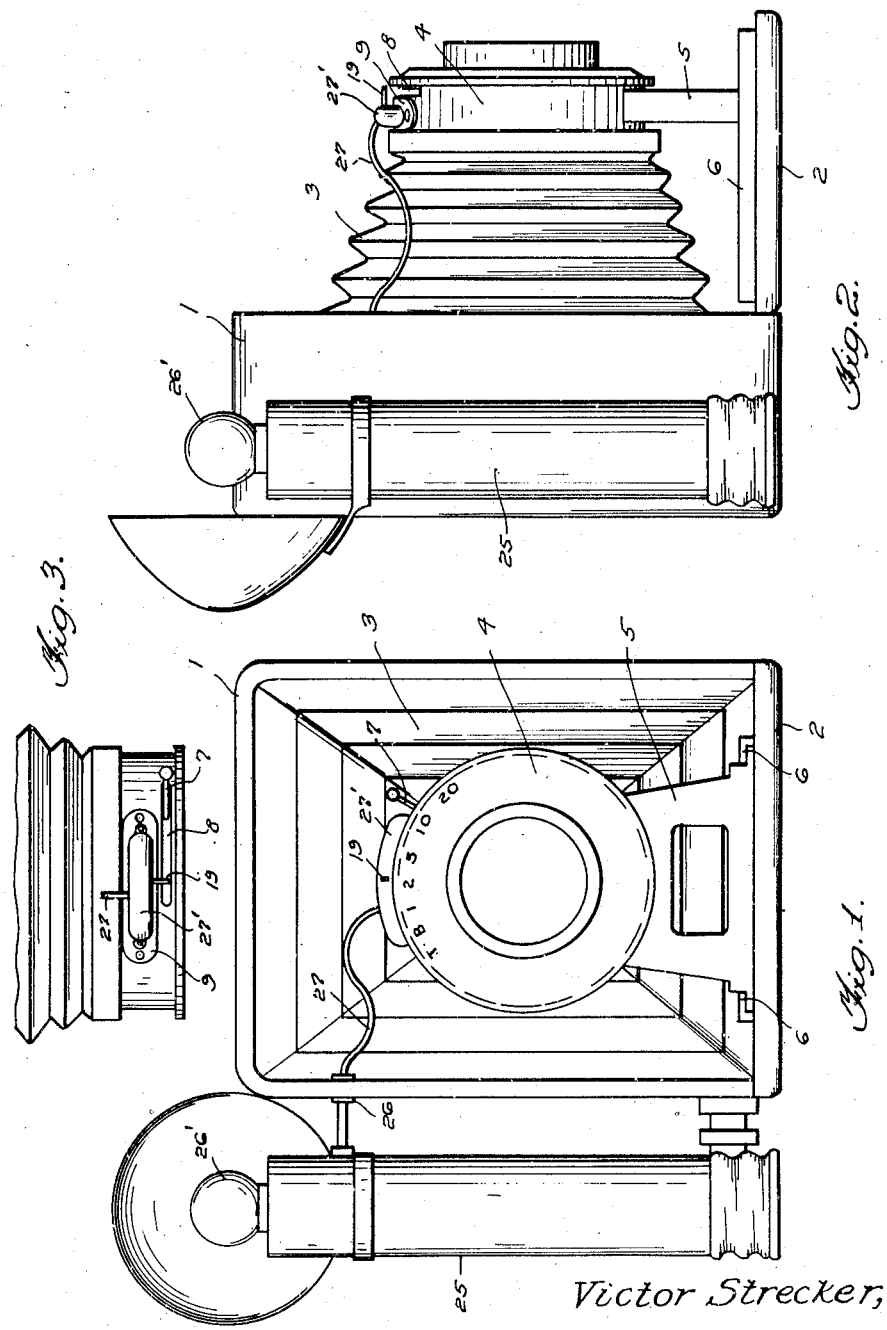
Inventor
Victor Strecker,
By Clarence A. O'Brien
and Harvey B. Jacobson
Attorneys

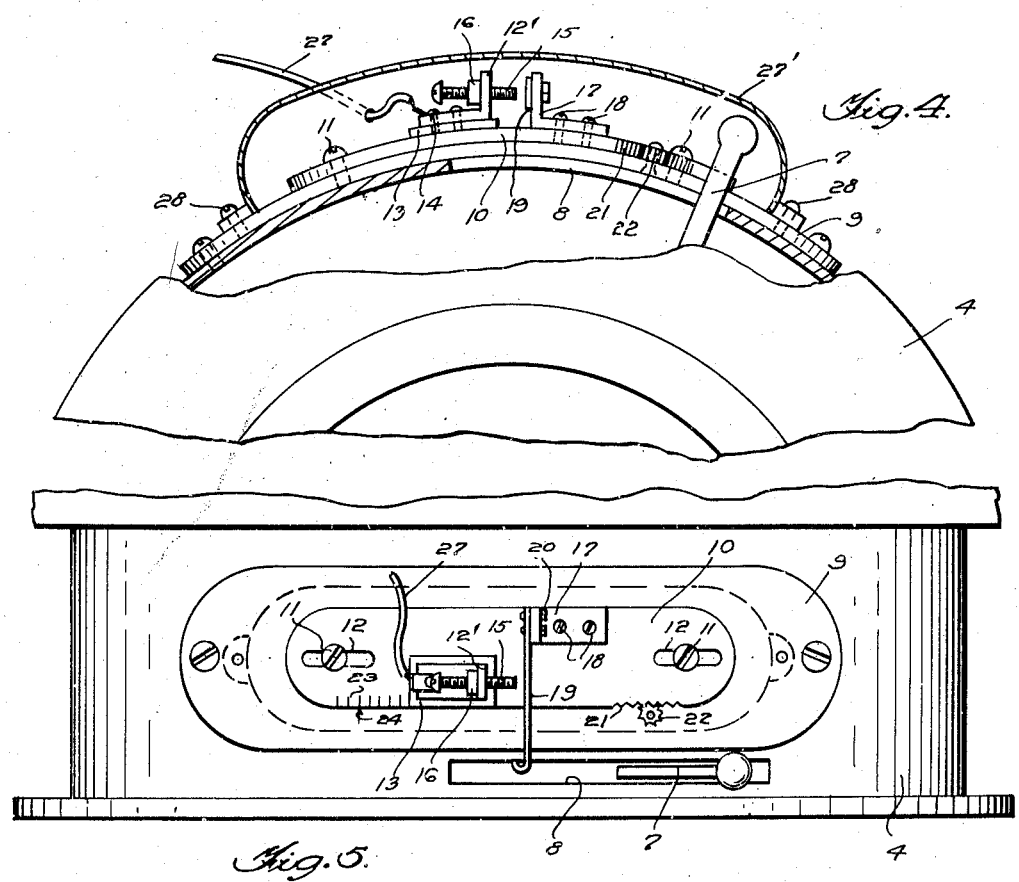
Fig. 4.
Fig. 5.
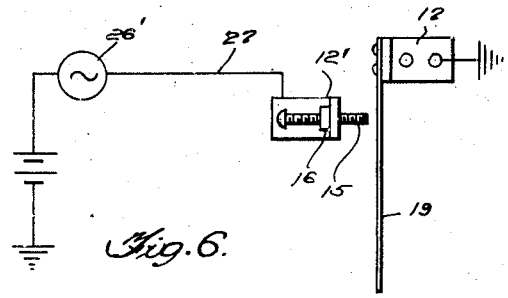
Fig. 6.
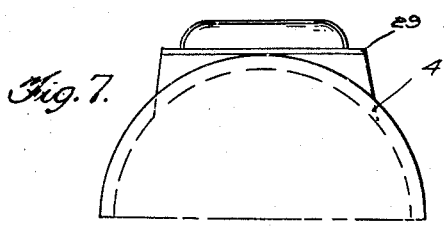
Fig. 7.
Inventor
Victor Strecker, Patented Oct. 18, 1949

2,484,915

UNITED STATES PATENT OFFICE 2,484,915

SHUTTER-OPERATED FLASH SYNCHRONIZING SWITCH HAVING ADJUSTABLE MOUNTING MEANS

Victor Strecker, Oakland, Calif.

Application November 5, 1946, Serial No. 707,886

1 Claim. (Cl. 95—11.5)

This invention relates to improvements in camera synchronizing means.

An object of the invention is to provide an improved camera synchronizing means for synchronizing the operation of the camera shutter and a flash bulb mechanism.

Another object of the invention is to provide an improved attachment for positioning upon a camera to synchronize the operation of the camera shutter and a flash bulb attachment also adapted to be supported upon the camera case.

A further object of the invention is to provide an improved camera synchronizing switch mechanism adapted to be attached upon a camera case as an accessory to cooperate with a flash light or bulb mechanism also adapted to be supported on the camera case, whereby the shutter operating lever will engage and operate the switch mechanism to synchronize the operation of the camera shutter with the operation of the flash bulb.

Another object of the invention is to provide an improved camera synchronizing means for synchronizing the operation of the camera shutter and flash bulb mechanism, said means being highly efficient and positive in operation, and relatively inexpensive to manufacture and produce.

Other objects will appear as the description proceeds.

In the accompanying drawings which form a part of this application,

Figure 1 is a front elevation of a folding bellows type camera in open position with a flash bulb mechanism on the camera and synchronizing means fixed thereon;

Figure 2 is a side elevation of the camera and equipment illustrated in Figure 1;

Figure 3 is a plan view of the forward end of the camera bellows and shutter housing with the camera synchronizing means in position thereon;

Figure 4 is an enlarged detail front elevation of the upper portion of a camera shutter housing partly broken away and in section to show the relation of the camera synchronizing means to the shutter operating arm or lever;

Figure 5 is an enlarged plan view of a camera shutter housing with the improved synchronizing means in position thereon;

Figure 6 is a diagrammatic view showing the switch mechanism and the wiring connections between the same and a flash bulb mechanism, and Figure 7 is a modified form of cover construction for a camera synchronizing mechanism.

Like characters of reference are used throughout the following specification and the accompanying drawings to designate corresponding parts.

In carrying out the invention, there is provided a camera having a case or body 1 having a hinged front panel 2 therefore and a foldable and extensible bellows 3 supported in said case or body 1 in the usual manner.

A shutter mechanism housing 4 will be supported on the frame 5 slidable on the tracks 6 on the inner surface of said front panel 2, and will be connected with the front end of said bellows 3. A shutter operating lever or pin 7 will be transversely operable in the slot 8 formed in the upper portion of said shutter housing 4.

An arcuate plate 9 will be secured to the upper surface of the shutter housing 4 immediately to the rear of said slot 8, and will support the arcuate supporting plate 10 for transverse adjustment by means of the screws 11 and the opposite slots 12 formed in the ends of said plate 10.

An L-shaped bracket 12' is mounted upon the strip 13, of insulating material, and the bracket 12' and strip 13 are secured to the plate 10 by means of the screws 14. The bracket 12' supports the threaded screw 15 and locking nut 16, which cooperates with a contact arm or finger 19 which is fixed by rivets 20 to an L-shaped bracket 17 secured upon the plate 10 by means of the screws 18.

A rack 21 is formed on the front edge of the plate 10 and is engaged by the gear 22 for moving the same into the desired adjusted position. A scale 23 and a fixed point 24 are formed respectively upon the plate 10 and the plate 9 for indicating the degree of adjustment.

The usual flashlight casing 25 will be supported upon one side of the camera case 1, the upper end being insulated by the insulating bushing 26 through which electric wire 27 extends to be connected with the L-shaped contact supporting bracket 12' insulated from the case 1. The lower end of the casing 25 will be attached to the camera case 1 to form an electrical contact therewith, thereby closing the circuit to "fire" the flash bulb 26 in the casing 25 when the shutter operating lever 7 is moved over to engage the switch arm 19 to close the same against the screw contact 15.

A cover 27' will be disposed over the synchronizing mechanism, the same being held in position by means of the screws 28 extending into the plate 9.

In the event that a flat support 29 is required for the synchronizing mechanism, the same is illustrated in Figure 7 of the drawings.

From the foregoing description, it will be apparent that there has been devised and provided a highly efficient form of synchronizing mechanism for synchronizing the shutter mechanism and a flash bulb mechanism for a camera.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

In a camera having a shutter, a housing for the shutter, a pivotal shutter actuating lever and a flash bulb mechanism; means for synchronizing the operation of the shutter and flash bulb mechanism comprising a base plate removably secured to the housing, a support plate slidably carried by the base plate, said support plate having a toothed edge, a rotary gear mounted on the base plate and engaging the toothed edge of said support plate, and a switch mechanism mounted on the support plate, said switch mechanism including a pair of spaced brackets fixed to said support plate, an adjustable screw mounted on one of said brackets and forming a first contact member, and a resilient contact arm fixed to the remaining of said brackets and normally spaced from said screw, said arm being disposed in the path of movement for said actuating lever whereby the latter will force the arm into engagement with said screw upon movement of the actuating lever in one direction.

VICTOR STRECKER.

REFERENCES CITED

The following references are of record in the file of this patent:

UNITED STATES PATENTS

| Number | Name | Date |
| --- | --- | --- |
| 1,824,030 | Armstead | Sept. 22, 1931 |
| 1,896,585 | Johnson | Feb. 7, 1933 |
| 1,945,942 | Lang | Feb. 6, 1934 |
| 2,020,741 | Rush | Nov. 12, 1935 |
| 2,180,276 | Carroll | Nov. 14, 1939 |
| 2,196,604 | Galter | Apr. 9, 1940 |
| 2,256,355 | Riddell | Sept. 16, 1941 |
| 2,350,258 | Steiner | May 30, 1944 |